United States Patent
Fleming et al.

(10) Patent No.: US 7,417,649 B2
(45) Date of Patent: Aug. 26, 2008

(54) METHOD AND APPARATUS FOR NONLINEAR ANAMORPHIC SCALING OF VIDEO IMAGES

(75) Inventors: Charles G. Fleming, Cupertino, CA (US); Ralph T. Brunner, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/634,416

(22) Filed: Dec. 5, 2006

(65) Prior Publication Data

US 2007/0076020 A1   Apr. 5, 2007

Related U.S. Application Data

(63) Continuation of application No. 10/388,245, filed on Mar. 12, 2003, now Pat. No. 7,158,158.

(51) Int. Cl.
    G09G 5/10 (2006.01)
(52) U.S. Cl. .................. 345/698; 345/660; 345/699
(58) Field of Classification Search .......... 345/698, 345/699, 660
    See application file for complete search history.

(56) References Cited

U.S. PATENT DOCUMENTS

| 4,790,028 A | 12/1988 | Ramage |
| 4,912,549 A * | 3/1990 | Altman et al. ............. 348/496 |
| 5,506,603 A | 4/1996 | Kawano et al. |
| 5,917,549 A | 6/1999 | Simons et al. |
| 6,178,272 B1 | 1/2001 | Segman |
| 6,417,867 B1 | 7/2002 | Hallberg |
| 7,149,369 B2 * | 12/2006 | Atkins ........................ 382/299 |
| 2002/0113823 A1 | 8/2002 | Card et al. |
| 2003/0117526 A1 * | 6/2003 | Kozai ......................... 348/445 |
| 2004/0075671 A1 | 4/2004 | Vale et al. |

OTHER PUBLICATIONS

Segal et al., "The OpenGL Graphics System: A Specification v. 1.2," Silicon Graphics, Inc. 1992-1998, pp. 1, 112.

* cited by examiner

*Primary Examiner*—Kee M. Tung
*Assistant Examiner*—Michelle K Lay
(74) *Attorney, Agent, or Firm*—Blakely, Sokoloff, Taylor & Zafman LLP

(57) ABSTRACT

Methods and apparatuses for nonlinear scaling of video images. To match the aspect ratios of a video image and the target display area, at least one embodiment of the present invention scales the video image according to one or more nonlinear functions along the horizontal direction and/or the vertical direction. In one embodiment, the nonlinear functions are such that the original aspect ratio of the video image is preserved near the center region (or strip) of the image and the image is gradually stretched (or compressed) as it is mapped to the edges. In one example, the scaling is implemented by the texture mapping functionality of OpenGL using graphics hardware. In one embodiment of the present invention, the nonlinear mapping is constructed according to a polynomial mapping; and, the coefficients of the polynomial are adjustable by a user to trade off distortion between the image center and the image edges, giving the user control over the location and the amount of distortion.

67 Claims, 11 Drawing Sheets

METHOD AND APPARATUS FOR NONLINEAR ANAMORPHIC SCALING OF VIDEO IMAGES

This application is a continuation of U.S. patent application Ser. No. 10/388,245, filed on Mar. 12, 2003 now U.S. Pat. No. 7,158,158.

FIELD OF THE INVENTION

The invention relates to display of video images, and more particularly to scaling of video images.

BACKGROUND OF THE INVENTION

A frame of a video image is typically represented by a rectangular array of pixels. The numbers of rows and columns of the rectangular array of pixels define the aspect ratio of the video image. A stream of video data typically contains a number of frames of video images, to be displayed at a given display area one frame after another. When the target display area is capable displaying a different number of rows or a different number of columns of pixels than those of the given video image, a portion of the target display area may be used to display the entire video image, or only a portion of the video image may be displayed on the target display area, without scaling.

To fit the entire video image onto the target display area, the video image is typically scaled linearly in the vertical direction and/or the horizontal direction. Since different scaling factors may be required to fit the entire video image onto the target display area, the aspect ratio of the original video image may be distorted after the scaling operation. Thus, a circle in the original video image may be displayed as an ellipse in the target display area.

SUMMARY OF THE DESCRIPTION

Methods and apparatuses for nonlinear scaling of video images are described here.

To match the aspect ratios of a video image and the target display area, at least one embodiment of the present invention scales the video image according to one or more nonlinear functions along the horizontal direction and/or the vertical direction. In one embodiment, the nonlinear functions are such that the original aspect ratio of the video image is preserved near the center region (or strip) of the image and the image is gradually stretched (or compressed) as it is mapped to the edges. In one example, the scaling is implemented by the texture mapping functionality of OpenGL using graphics hardware. In one embodiment of the present invention, the nonlinear mapping is constructed according to a polynomial mapping; and, the coefficients of the polynomial are adjustable by a user to trade off distortion between the image center and the image edges, giving the user control over the location and the amount of distortion.

In at least one embodiment of the present invention, a method to scale a first video image having a first aspect ratio includes: performing nonlinear scaling of the first video image along each of at least one direction (e.g., a direction along the horizontal or vertical pixel lines of the first video image), to generate a second video image of a second aspect ratio that is different from the first aspect ratio. In one example, a first rectangular region of the first video image is scaled as a corresponding first rectangular region of the second video image; the aspect ratios of the first rectangular region of the first video image and the first rectangular region of the second video image are substantially the same; a second rectangular region of the first video image is scaled as a corresponding second rectangular region of the second video image; and, the aspect ratios of the second rectangular region of the first video image and the second rectangular region of the second video image are substantially different. In one example, user input is received to specify one of: a) the first rectangular region of the first video image; and, b) the first rectangular region of the second video image. In one example, the first video image has a first rectangular boundary of the first aspect ratio; and, the second video image has a second rectangular boundary of the second aspect ratio. In one example, the nonlinear scaling of the first video image includes piecewise linear scaling of a plurality of regions according to different scaling factors; and, graphics hardware (e.g., a graphics processing unit (GPU)) of a data processing system is instructed (e.g., by the central processing unit (CPU) of the data processing system) to perform the piecewise linear scaling of the plurality of regions. In one example, user input is received to specify the nonlinear scaling; and, the plurality of regions for nonlinear scaling are determined according to the user input. In one example, the graphics hardware also converts the first video image from a first color space (e.g., YUV) to the second video image in a second color space (RGB). In one example, the second video image is stored in a frame buffer for display on a display device of the data processing system. In another example, a circuit is integrated with a display device for scaling different video signals of different aspect ratios.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to an or one embodiment in the present disclosure are not necessary to the same embodiment; and, such references means at least one.

Figure 1:
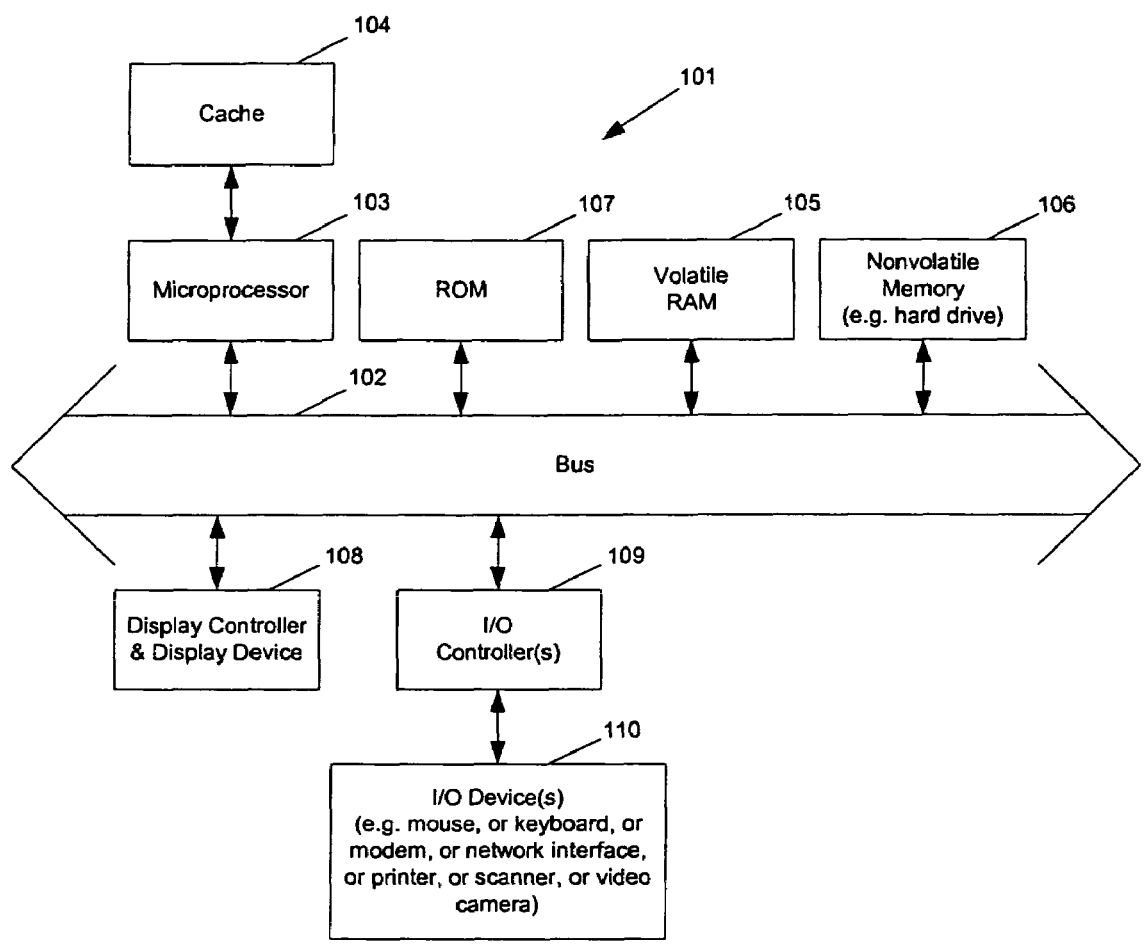
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to preserve the original aspect ratio near an area of interest using nonlinear scaling of video images.

When a video image is scaled linearly by different scaling factors along the horizontal and vertical directions, the aspect ratio of the video image is changed uniformly across the video image. A circle at any location on the original video image is displayed as an ellipse of the same aspect ratio.

According to one embodiment of the present invention, it is desirable to maintain the original aspect ratio in an area of interest (e.g., at the center of the image) and gradually stretch the image in other areas. Thus, the image in the area of interest is presented in the target display area with reduced distortion (or with no distortion), while other areas are distorted. Nonlinear scaling is used according to one embodiment of the present invention to achieve such results.

Figure 2:
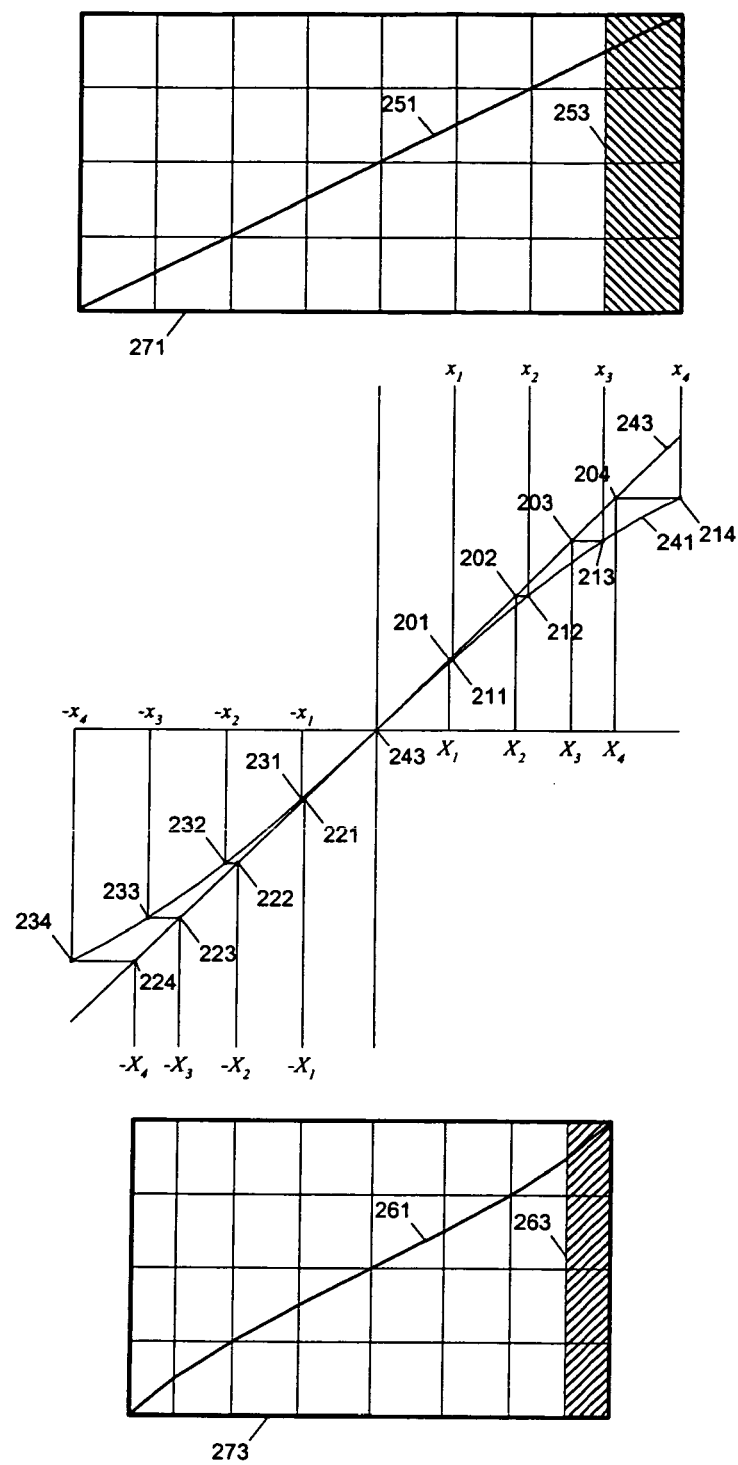
FIGS. 2-4 show examples of nonlinear anamorphic scaling of video images according to embodiments of the present invention.
Figure 3:
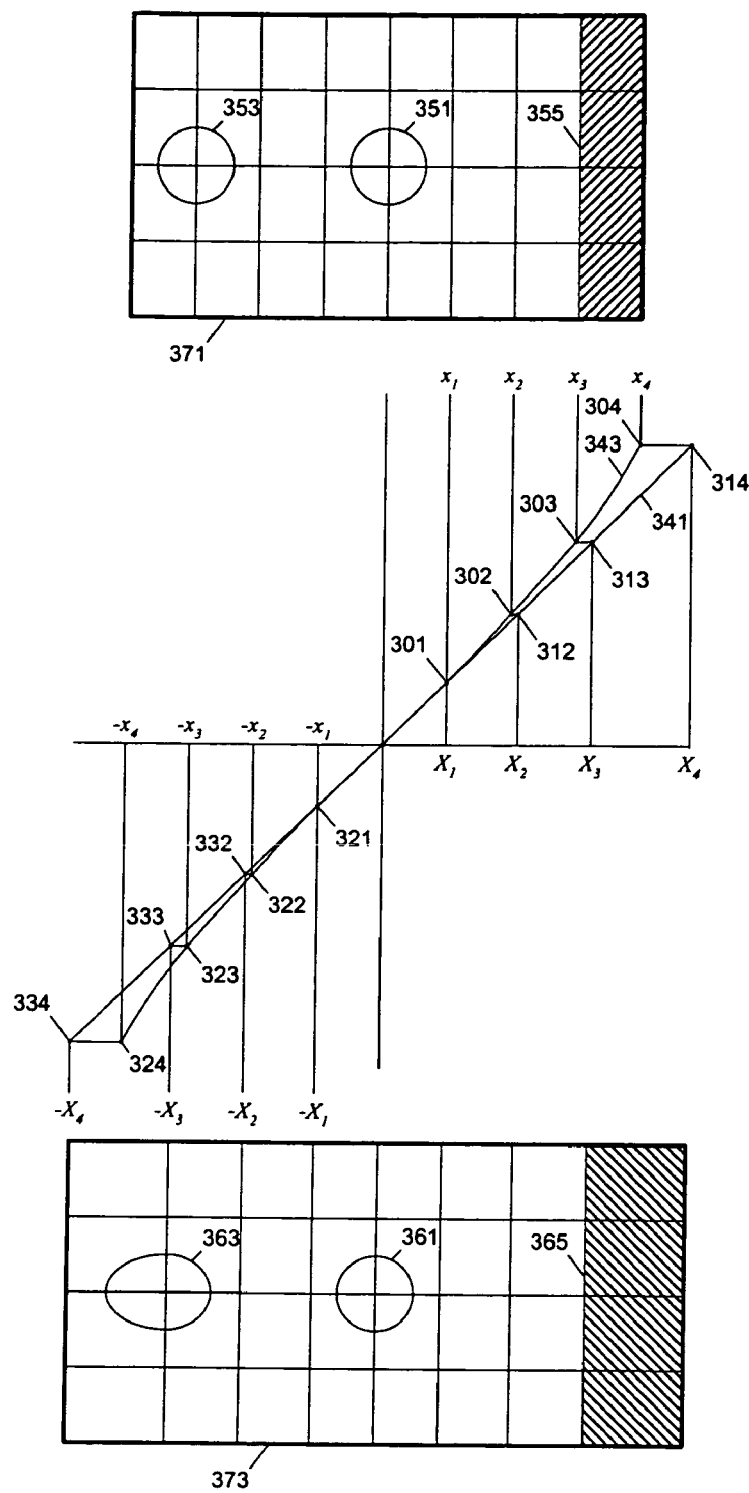
Figure 4:
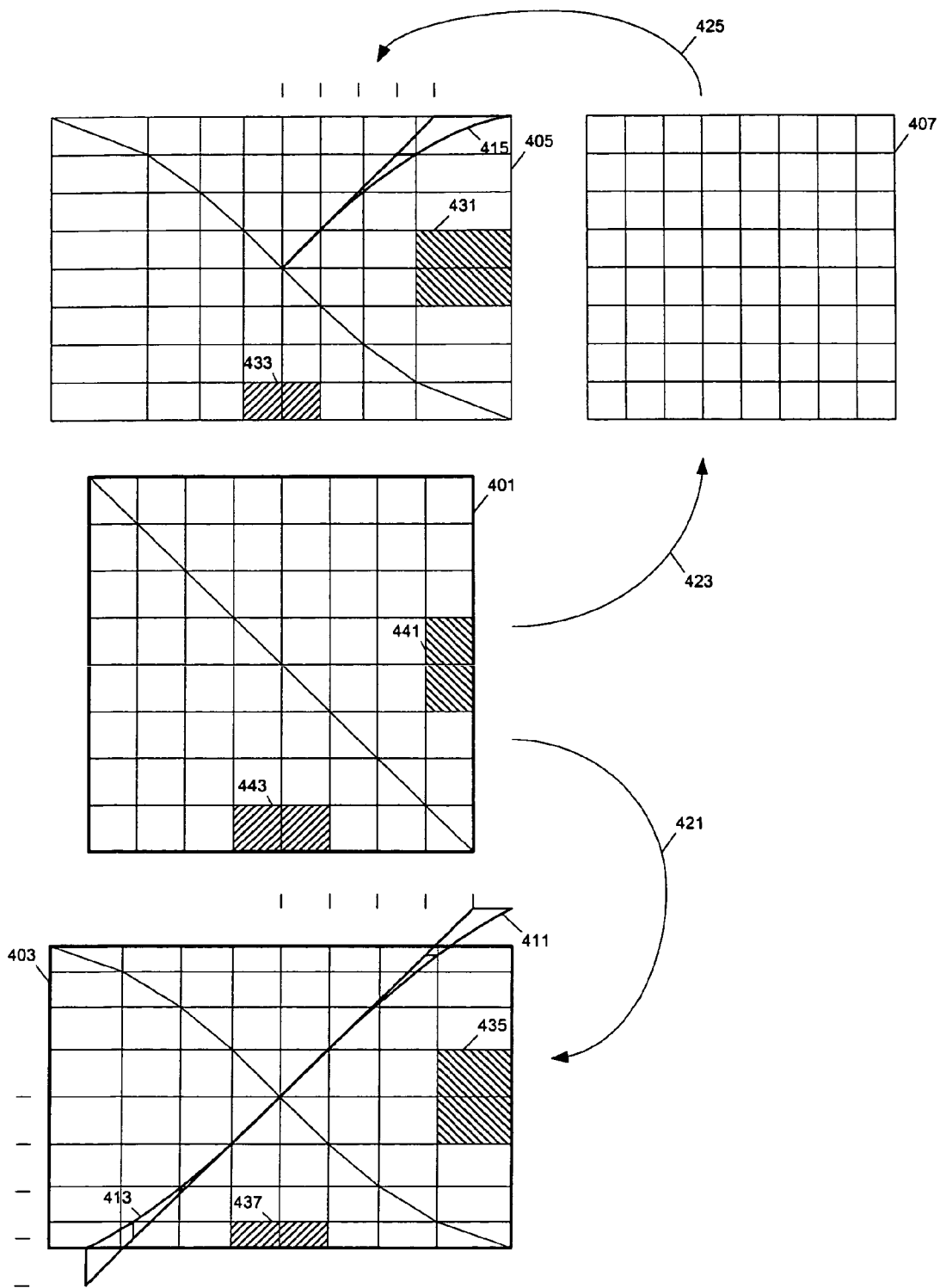

FIGS. 2-4 show examples of nonlinear anamorphic scaling of video images according to embodiments of the present invention.

In the example of FIG. 2, image 271 is scaled nonlinearly in the horizontal direction to reduce the width to that of image 273. To preserve the original aspect ratio near the center of image 271, nonlinear mapping according to nonlinear curve 241 is used to map the positions of the vertical lines along the horizontal direction. For example, the vertical line at $x=x_4$ (214) in image 271 is mapped to the vertical line at $X=X_4$ (204) in image 273. Similarly, horizontal positions represented by points 213, 212 and 211 ($x_3, x_2, x_1$) in image 271 are mapped to horizontal positions represented by points 203, 202 and 201 ($X_3, X_2, X_1$) in image 273; and, 231-234 to 221-224. Thus, evenly spaced vertical lines in image 271 are displayed as non-evenly spaced vertical lines in image 273. For example, shaded region 253 is displayed as region 263. Since the nonlinear scaling is applied only to the horizontal direction, the change of aspect ratio is uniform along the vertical direction, while non-uniform along the horizontal direction. The slope of curve 241 near the center (243) of the image is adjusted so that the original aspect ratio near the center is preserved in image 273. Thus, a square region at the center of image 271 is mapped (or scaled) as a square (or a rectangle substantially close to a square) in image 273. While the straight horizontal and vertical lines of image 271 are mapped as the corresponding straight horizontal and vertical lines of image 273, a straight line of a slant angle (e.g., line 251) is displayed as a curve (e.g., curve 261), due to the nonlinear scaling in the horizontal direction. It will be appreciated that "linear" means that a change in the x coordinate value (e.g., x changes from 1 to 2) produces a constant multiple of that change in the y coordinate value (e.g., y changes from 2 to 4 if y=2 x). Non-linear normally means that a change in x produces a change in y which is other than a constant multiple of that change (or x value) along at least a portion of the function which describes the nonlinear relationship or curve.

In the example of FIG. 3, image 371 is scaled nonlinearly in the horizontal direction to increase the width to that of image 373. Nonlinear curve 343 is used to map the vertical lines of image 371 from positions 302-304 to positions 314, and 322-324 to 332-334. The positions of the vertical lines at x=±$x_1$ (301 and 321) remain unchanged. Thus, the center strip of image 371 is displayed without distortion as the center strip of image 373, while the side strips of image 371 (e.g., strip 355) are stretched horizontally (e.g., as strip 365) to fill the display region. Circle 351 in the center strip of image 371 is displayed as circle 361 in the center strip of image 373. However, circle 353 is distorted as curve 363. Since the detail at the center strip is typically of more interest to a viewer, the nonlinear scaling in the example preserves the original feature of the video image in the area of interest, the center strip.

FIGS. 2 and 3 illustrate the examples of nonlinear scaling in the horizontal direction, while the vertical direction is not scaled. In general, linear scaling in both directions can also be combined with nonlinear scaling (either in the vertical direction or in the horizontal direction) so that the aspect ratio of the area of interest (e.g., the center strip) is preserved. Typically, the linear scaling and the nonlinear scaling are performed in one combined operation.

According to one embodiment of the present invention, nonlinear scaling is applied in both the vertical direction and the horizontal direction. In FIG. 4, image 401 is stretched in the horizontal direction and compressed in the vertical direction to generate image 403. Nonlinear scaling is applied in both directions in operation 421. Curve 411 is used to map the horizontal positions of the vertical lines; and, curve 413 is used to map the vertical positions of the horizontal lines. Thus, while the aspect ratio of the portions of the image near the boundary is distorted, the aspect ratio of the center region of the image is preserved. Alternatively, linear scaling can be combined with nonlinear scaling in operations 423 and 425 to generate image 405. Curve 415 is used for the nonlinear horizontal scaling. In image 405, the aspect ratio of the center strip is preserved. For example, region 433 near the bottom of image 405 has the same aspect ratio as region 443 of image 401. However, when region 431 is compared to region 441, it is seen that the vertical boundary strips are severely distorted. In image 403, while both regions 437 and 435 are distorted in aspect ratio, region 435 has less distortion than region 431. Thus, the distortion of aspect ratio is distributed around the boundary region in image 403, while the distortion is concentrated in the boundary strips in image 405.

In FIG. 4, it is seen that image 407 can also be scaled nonlinearly in both directions to generate image 403. In one embodiment of the present invention, when a video image is required to fill a display area with a linear horizontal scaling factor A and a linear vertical scaling factor B, where A≠B, nonlinear scaling can be constructed to have a scaling factor C at the center of interest (e.g., the center of the image) to preserve the aspect ratio at the center of interest. In one embodiment of the present invention, C is chosen so that C is between A and B; and, the aspect ratio of the image is compressed nonlinearly along one direction and stretched nonlinearly along the other direction. When C approaches A, the horizontal scaling approaches from nonlinear scaling to linear scaling; when C approaches B, the vertical scaling approaches from nonlinear scaling to linear scaling. In one embodiment of the present invention, a user specifies the area of interest; and, the nonlinear scaling is constructed according to the location and the size of the area of interest.

Various nonlinear curves can be used for the construction of nonlinear scaling. For example, a cubical polynomial can be used to map the coordinates. For instance, when a video image is required to fill a display area with a linear horizontal scaling factor A and a linear vertical scaling factor B, the image can be linearly scaled by factor A in the horizontal direction using mapping X=A x and be nonlinearly scaled in the vertical direction using mapping $Y=y(A+(B-A)\times(y/H)^2)$, where H is the half height of the video image, (x, y) are the coordinates of a point in the video image, and (X, Y) is the coordinates of the corresponding point in the scaled image. Thus, the region near y=0 is scaled by a factor close to A in both the horizontal and vertical direction, while the regions near y=±H are scaled by a factor of A in the horizontal direction, and a factor of (3B-2A). Functions other than the cubical polynomial can also be used. For example, a curve-fit function generated based on a number of control points can be used. The control points can be predefined or received from user input devices (e.g., through a control button, or a graphical user interface, or a voice recognition system). Piecewise functions (e.g., piecewise linear functions) can also be used.

Figure 5:
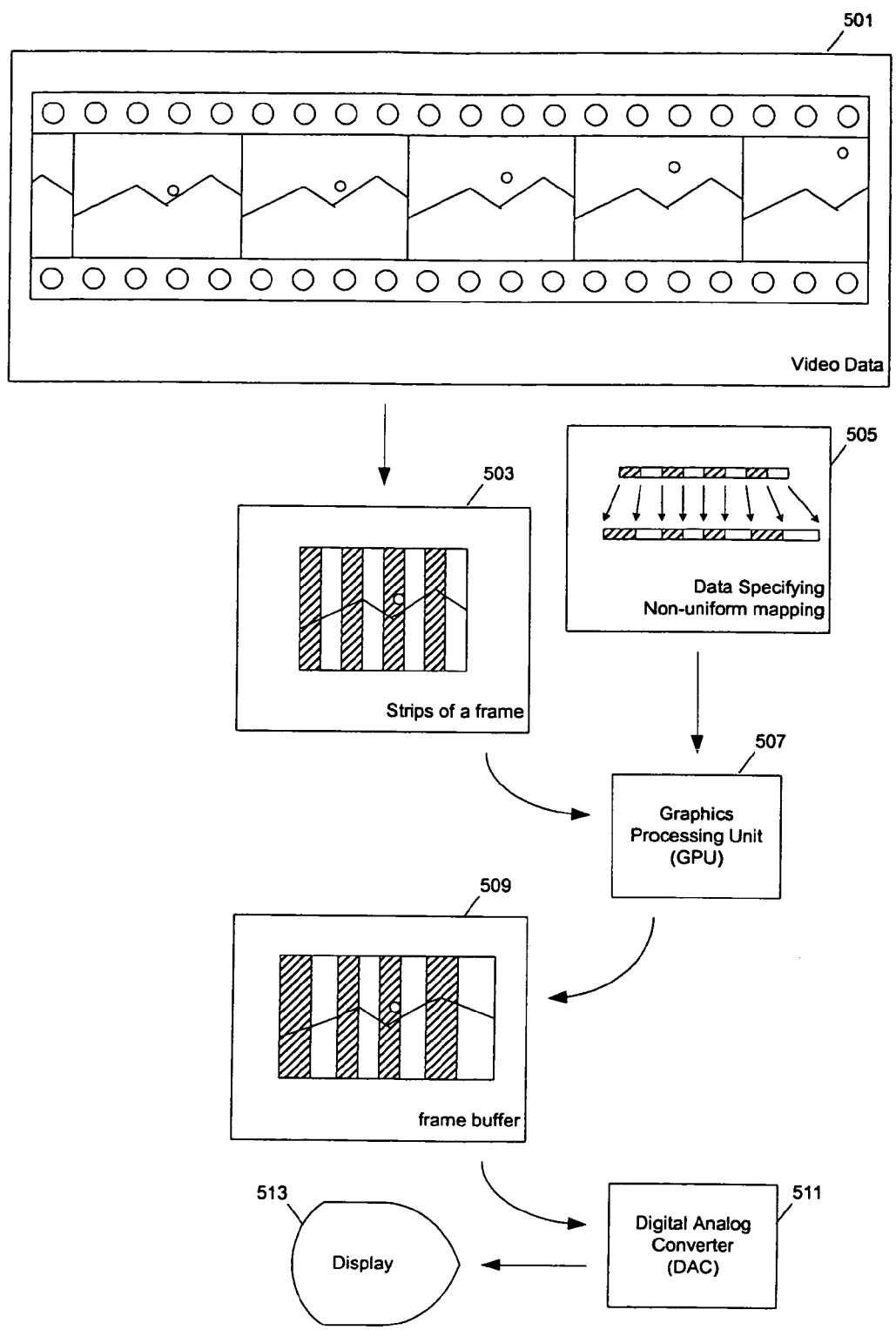
FIGS. 5-6 show examples of nonlinear anamorphic scaling of video images using graphics hardware of a data processing system according to embodiments of the present invention.
Figure 6:
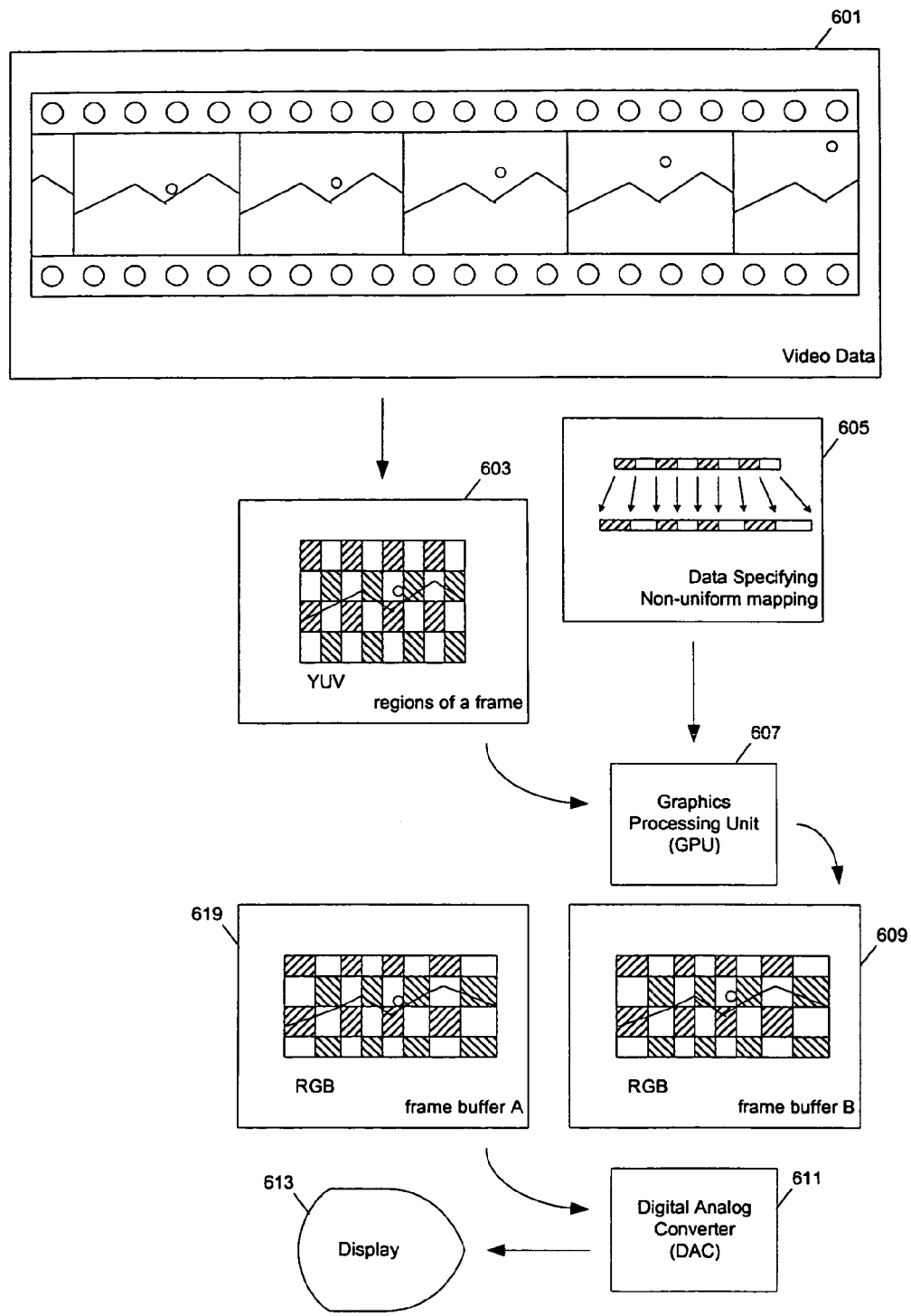

FIGS. 5-6 show examples of nonlinear anamorphic scaling of video images using graphics hardware of a data processing system according to embodiments of the present invention.

In FIG. 5, a computer program processes video data 501 having separate frames (e.g., stored on memory of a data processing system, such as volatile RAM 105 or nonvolatile memory 106 in FIG. 1). Each frame may be part of a sequence of related images, as in a movie. Each frame of video image is nonlinearly scaled according to embodiments of the present invention using graphics hardware (e.g., display controller 108 in FIG. 1). For example, a frame is divided into a number of strips (503). The data specifying the non-uniform mapping (505) is used to define the scaling of each of strips using the graphics hardware (e.g., graphics processing unit (GPU) 507). Various graphics hardware known in the art can be used to efficiently scale the strips of images. The graphics hardware linearly scales each strip according the instructions (e.g., sent from the central processing unit (CPU)). Through graphics function calls (e.g., OpenGL, or DirectX), the graphics hardware can be instructed to scale each strips linearly. Thus, each frame of image (503) is piecewise linearly scaled and stored in a frame buffer (509). Typically, a digital analog converter (DAC) 511 converts the data in the frame buffer into signals for controlling display 513. The target area in the frame buffer can be a portion of the frame buffer so that the video is displayed on only a portion of a display device (e.g., a Cathode Ray Tube (CRT) monitor, a Liquid Crystal Display (LCD) panel, or others). The target area can also be the entire frame buffer so that the video is displayed on the entire display area of the display device.

Different schemes can be used in determining the strips and coordinates for instructing the graphics hardware to perform the scaling. For example, the original video image can be divided into evenly spaced strips so that the graphics hardware can scale them into strips of different widths for the frame buffer. Alternatively, the original video image may be so divided that, after the scaling, the corresponding strips have the same width. The nonlinear scaling in one direction can be to either stretch or compress the aspect ratio along this direction.

In FIG. 6, both the horizontal and the vertical directions are scaled piecewise linearly using a graphics processing unit (607). A frame of video image from video data 601 is divided into a number of rectangular regions (603). The graphics processing unit linearly scales each of the rectangular regions to achieve the overall nonlinear scaling in both directions (e.g., by using different scaling factors for different regions). In one embodiment of the present invention, the graphics hardware also converts the image data from one color space (e.g., YUV of the video data) to another (e.g., RGB suitable for controlling display device). In one embodiment of the present invention, double buffering is used for the frame buffer so that when the graphics processing unit is generating one frame of video image in one of the frame buffers (e.g., 609), the digital analog converter (DAC) generates display signals for the previous frame in the other frame buffer (e.g., 619). After the graphics processing unit finishing scaling the current frame, the frame buffers are switched in roles.

In one embodiment of the present invention, the nonlinear scaling (e.g., the location and size of the area of interest) is adjustable by a user so that the user can adjust the scaling in real time according to the user's preferences.

At least some embodiments of the nonlinear scaling of the present inventions can also be applied to display devices, such as monitors, display panels, television sets or high definition television sets. The display devices according to one embodiment of the present invention contain circuits for nonlinearly scaling video signals to compensate distortions in aspect ratio due to linear scaling at areas of interest (typically the center region or strip of the display device).

Figure 7:
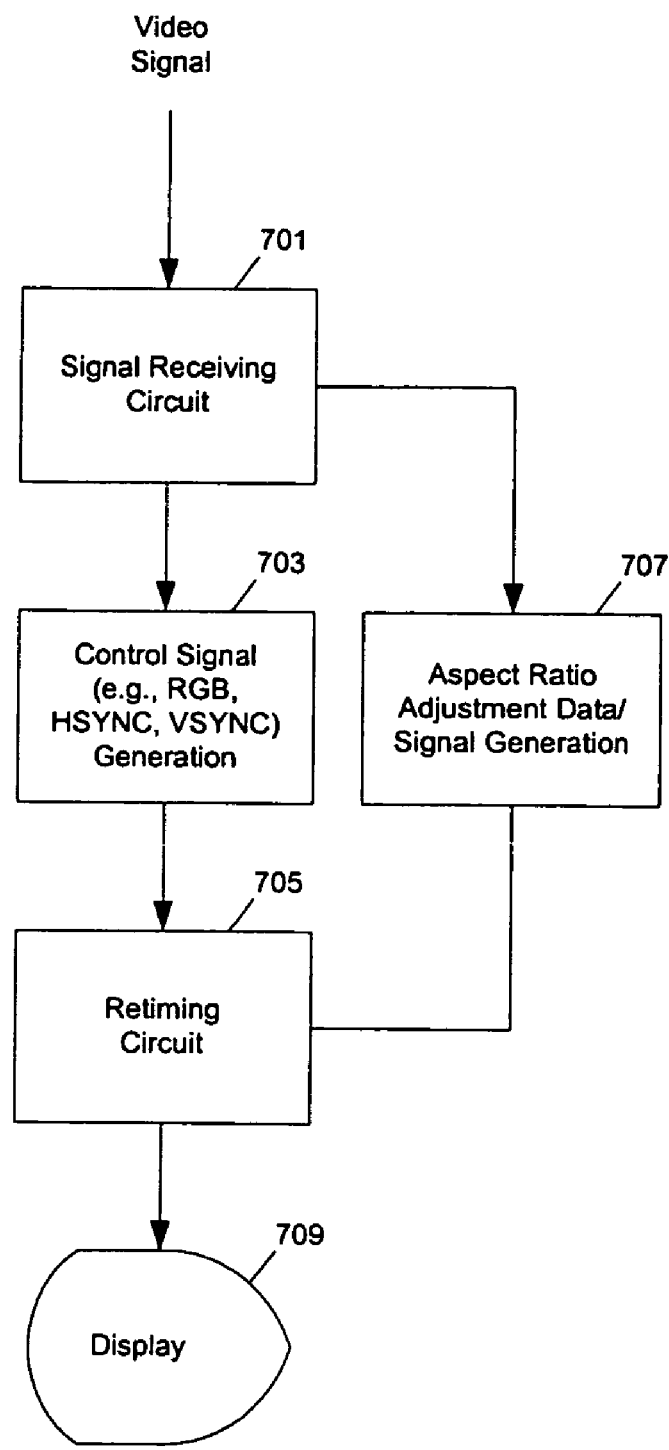
FIGS. 7-8 show block diagram examples of display devices for nonlinear anamorphic scaling of video images according to embodiments of the present invention.
Figure 8:
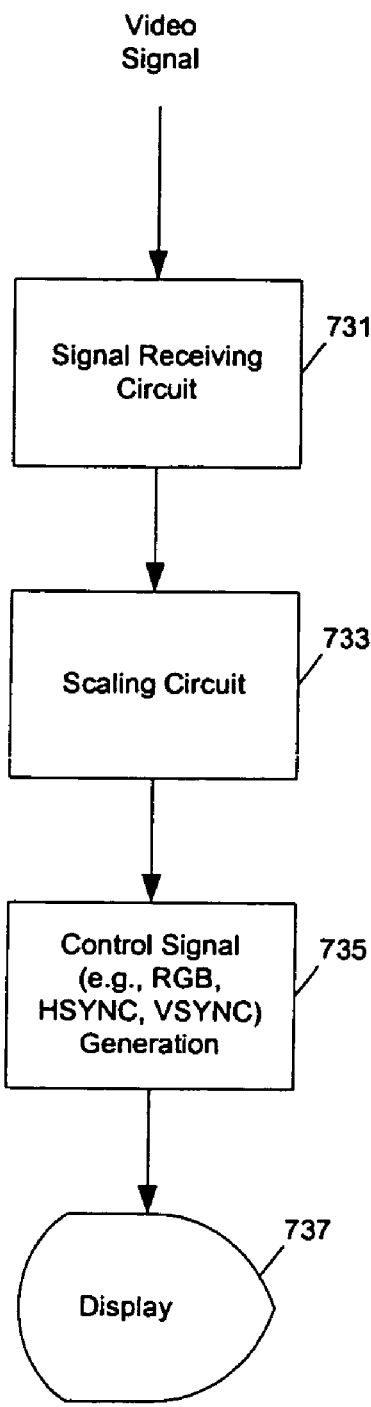

FIGS. 7-8 show block diagram examples of display devices for nonlinear anamorphic scaling of video images according to embodiments of the present invention.

In FIG. 7, after the video signal is received from a source (e.g., an external connection, or a turner) at signal receiving circuit 701, the control signals (e.g., RGB color signals, horizontal and vertical synchronization signals (HSYNC and VSYNC)) are generated (e.g., according to linear scaling in both directions). Under control of aspect ratio adjustment data/signal (e.g., received from a control button of the display device, or determined from the input video signal and the aspect ratio of the display device), retiming circuit 705 adjusts the timing of the horizontal (and/or vertical) scanline control signal to scale the image in the horizontal (or vertical) direction nonlinearly. For example, the horizontal scanline control signal of a CRT monitor can be changed from a linear function of time to a nonlinear function of time so that the timing of the activation of the pixels on the scanline is remapped to effectively perform nonlinear scaling along the horizontal direction. In one embodiment of the present invention, the information about the original aspect ratio of the video signal (701) is combined with the information of the aspect ratio of the display device (709) and the user input about the nonlinear scaling (e.g., the area of interest, or, the degree of nonlinearity) to generate the aspect ratio adjustment data. From this description, a person skilled in the art will understand that various circuits can be used to as the retiming circuit (705) to perform the nonlinear scaling. In addition to analog circuits for performing the nonlinear scaling (e.g., using the nonlinear scanline control signals), digital circuits can also be used, when analog to digital and/or digital to analog converters are used.

For example, in FIG. 8, video signal (e.g., signals from an external source, a television turner, a high definition television turner, a digital video source, such as digital cable television, digital satellite television) is received at the signal receiving circuit 731 for display on device 737. To fit the video image into the display are of display device 737, scaling circuit 733 nonlinearly scales the video image (e.g., to preserve the original aspect ratio of the video image at an area of interest, such as the center region or center strip of the display device). Then, control signals 735 (e.g., RGB signals and horizontal and vertical synchronization signals) are generated from displaying the video image on display device 737. In one embodiment of the present invention, scaling circuit 733 includes a buffer for pipelining the process of nonlinear scaling and the generation of control signals.

A typical CRT computer monitor contains buttons for adjusting various properties of the CRT monitor, such as the brightness, contrast, horizontal/vertical position or size of the display area, and the shape of the display area (e.g., trapezoid correction). According to one embodiment of the present invention, a display device also contains buttons for adjusting the nonlinear scaling.

Figure 9:
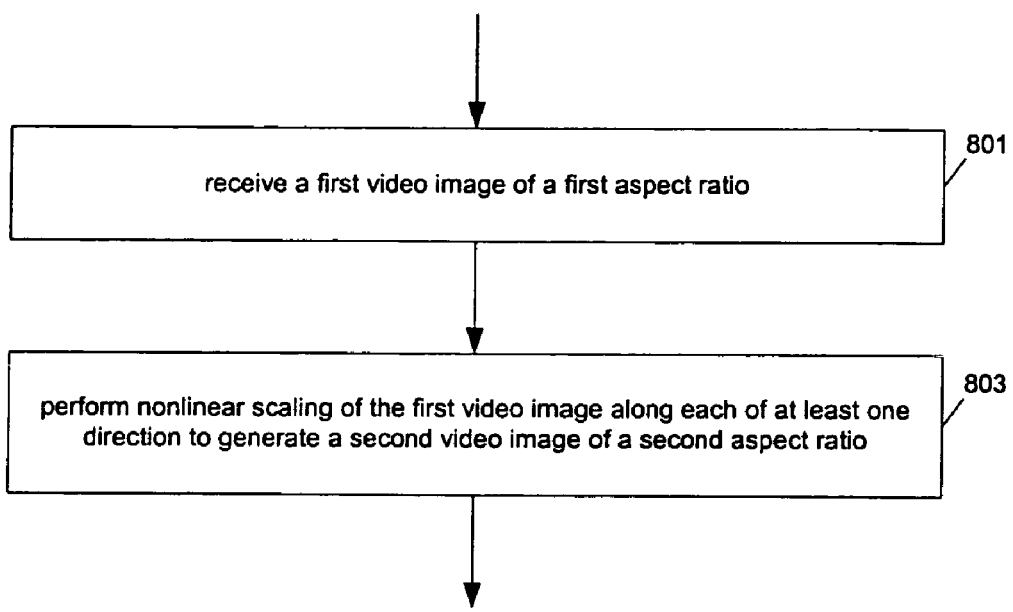
FIG. 9 shows a method to scale video images according to one embodiment of the present invention.

FIG. 9 shows a method to scale video images according to one embodiment of the present invention. After operation 801 receives a first video image of a first aspect ratio, operation 803 performs nonlinear scaling of the first video image along each of at least one direction to generate a second video image of a second aspect ratio. In one embodiment of the present invention, horizontal and vertical lines of a video image are scaled as horizontal and vertical lines in the scaled image so that rectangular regions of the video image remains as a rectangular region (or a square, a special case of a rectangular region) after the nonlinear scaling.

Figure 10:
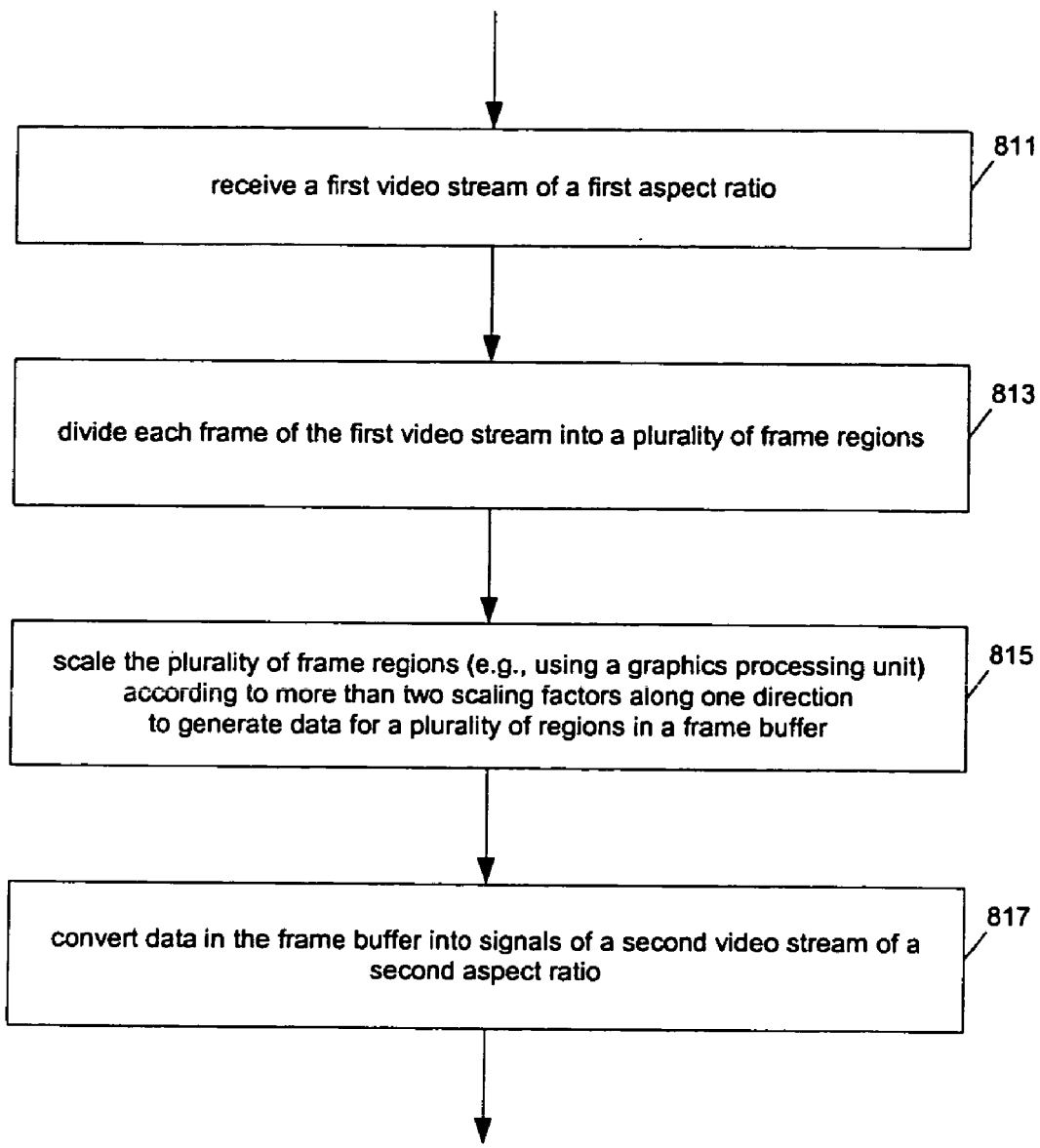
FIG. 10 shows a detailed method to piecewisely scale video images according to one embodiment of the present invention.

FIG. 10 shows a detailed method to piecewisely scale video images according to one embodiment of the present invention. Operation 811 receives a first video stream of a first aspect ratio. Operation 813 divides each frame of the first video stream into a plurality of frame regions. Operation 815 scales the plurality of frame regions (e.g., using a graphics processing unit) according to more than two scaling factors along one direction to generate data for a plurality of regions in a frame buffer. Operation 817 converts data in the frame buffer into signals of a second video stream of a second aspect ratio.

Figure 11:
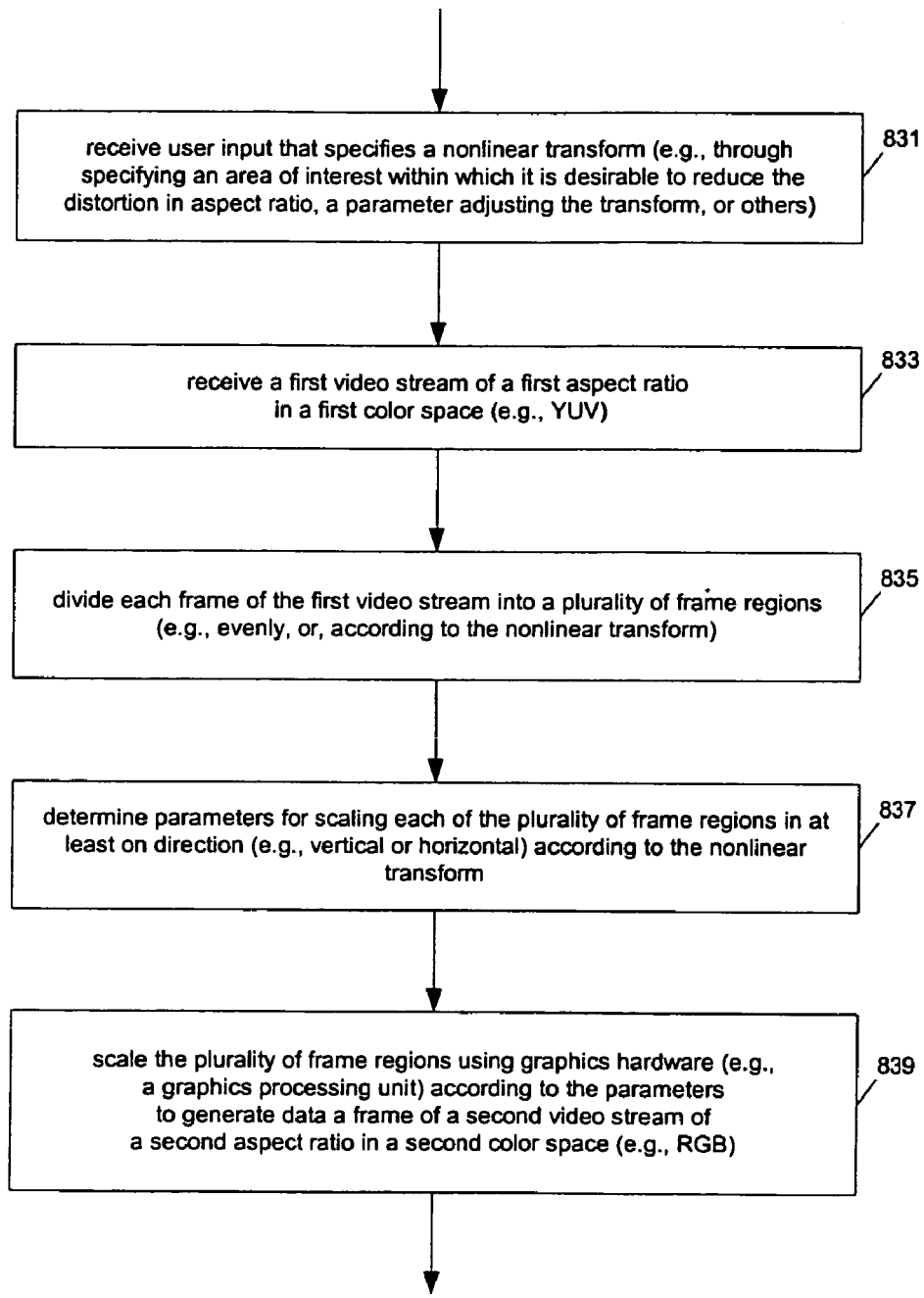
FIG. 11 shows a method to adjust the aspect ratio of a video image according to one embodiment of the present invention.

FIG. 11 shows a method to adjust the aspect ratio of a video image according to one embodiment of the present invention. Operation 831 receives user input that specifies a nonlinear transform (e.g., through specifying an area of interest within which it is desirable to reduce the distortion in aspect ratio, a parameter adjusting the transform, or others). Operation 833 receives a first video stream of a first aspect ratio in a first color space (e.g., YUV). Operation 835 divides each frame of the first video stream into a plurality of frame regions (e.g., evenly, or, according to the nonlinear transform). For example, the frame of the first video stream can be so divided that these regions, after the scaling, will be of even size on the target display area. Operation 837 determines parameters for scaling each of the plurality of frame regions in at least on direction (e.g., vertical or horizontal) according to the nonlinear transform. Operation 839 scales the plurality of frame regions using graphics hardware (e.g., a graphics processing unit) according to the parameters to generate data a frame of a second video stream of a second aspect ratio in a second color space (e.g., RGB).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method to scale a video image, the method comprising:
   determining a nonlinear function to transform a first video image having a first aspect ratio to a second video image having a second aspect ratio, the second aspect ratio being different from the first aspect ratio, wherein the nonlinear function comprises piecewise linear scaling of a plurality of regions according to different scaling factors along at least one direction;
   performing nonlinear scaling of the first video image along the at least one direction according to the nonlinear function to generate the second video image; and
   wherein the second video image is capable of being displayed on a display device.

2. A method as in claim 1 wherein the first aspect ratio is preserved at a center portion of the second video image.

3. A method as in claim 1 wherein the first video image comprises a video image frame from a video stream comprising a plurality of frames.

4. A method as in claim 1 wherein the determining comprises determining the nonlinear function based on user input.

5. A method as in claim 1 wherein a texture mapping functionality of graphics hardware is used to perform the nonlinear scaling.

6. A method as in claim 5 wherein the graphics hardware is instructed by graphics functions of one of: a) OpenGL; and, b) DirectX.

7. A method as in claim 1 wherein the second video image has at least two different aspect ratios within the second video image.

8. A method as in claim 1 wherein a first rectangular region of the first video image is scaled as a first rectangular region of the second video image; aspect ratios of the first rectangular region of the first video image and the first rectangular region of the second video image are substantially the same; a second rectangular region of the first video image is scaled as a second rectangular region of the second video image; and aspect ratios of the second rectangular region of the first video image and the second rectangular region of the second video image are substantially different.

9. A method as in claim 8 further comprising:
   receiving input specifying one of:
   a) the first rectangular region of the first video image; and
   b) the first rectangular region of the second video image.

10. A method as in claim 1 wherein the first video image has a first rectangular boundary of the first aspect ratio; and, the second video image has a second rectangular boundary of the second aspect ratio.

11. A method as in claim 10 wherein the at least one direction comprises at least one of:
    a) a direction along horizontal pixel lines of the first video image; or
    b) a direction along vertical pixel lines of the first video image.

12. A method as in claim 11 wherein the at least one direction comprises:
    a) a direction along horizontal pixel lines of the first video image; and
    b) a direction along vertical pixel lines of the first video image.

13. A method as in claim 1 wherein the plurality of regions are equally divided along the at least one direction.

14. A method as in claim 1 further comprising:
    instructing graphics hardware of a data processing system to perform the piecewise linear scaling of the plurality of regions.

15. A method as in claim 14 wherein the graphics hardware comprises a graphics processing unit (GPU); and, the data processing system comprises a central processing unit (CPU).

16. A method as in claim 15 further comprising:
    receiving input specifying the nonlinear sealing.

17. A method as in claim 16 further comprising:
    determining the plurality of regions according to the input.

18. A method as in claim 14 wherein the graphics hardware converts the first video image from a first color space to the second video image in a second color space.

19. A method as in claim 18 wherein the second video image is stored in a frame buffer for display on the display device of the data processing system.

20. A computer readable storage medium containing executable computer program instructions which when executed by a digital processing system cause said system to perform a method to scale a video image, the method comprising:
    determining a nonlinear function to transform a first video image having a first aspect ratio to a second video image having a second aspect ratio, the second aspect ratio being different from the first aspect ratio, wherein the nonlinear function comprises piecewise linear scaling of a plurality of regions according to different scaling factors along at least one direction; and
    performing nonlinear scaling of the first video image along the at least one direction according to the nonlinear function to generate the second video image; and
    wherein the second video image is capable of being displayed on a display device.

21. A medium as in claim 20 wherein the first aspect ratio is preserved at a center portion of the second video image.

22. A medium as in claim 20 wherein the first video image comprises a video image frame from a video stream comprising a plurality of frames.

23. A medium as in claim 20 wherein the determining comprises determining the nonlinear function based on user input.

24. A medium as in claim 20 wherein a texture mapping functionality of graphics hardware is used to perform the nonlinear scaling.

25. A medium as in claim 24 wherein the graphics hardware is instructed by graphics functions of one of: a) OpenGL; and, b) DirectX.

26. A medium as in claim 20 wherein the second video image has at least two different aspect ratios within the second video image.

27. A medium as in claim 20 wherein a first rectangular region of the first video image is scaled as a first rectangular region of the second video image; aspect ratios of the first rectangular region of the first video image and the first rectangular region of the second video image are substantially the same; a second rectangular region of the first video image is scaled as a second rectangular region of the second video image; and aspect ratios of the second rectangular region of the first video image and the second rectangular region of the second video image are substantially different.

28. A medium as in claim 27 wherein the method further comprises:
receiving input specifying one of:
a) the first rectangular region of the first video image; and
b) the first rectangular region of the second video image.

29. A medium as in claim 20 wherein the first video image has a first rectangular boundary of the first aspect ratio; and, the second video image has a second rectangular boundary of the second aspect ratio.

30. A medium as in claim 29 wherein the at least one direction comprises at least one of:
a) a direction along horizontal pixel lines of the first video image; or
b) a direction along vertical pixel lines of the first video image.

31. A medium as in claim 30 wherein the at least one direction comprises:
a) a direction along horizontal pixel lines of the first video image; and
b) a direction along vertical pixel lines of the first video image.

32. A medium as in claim 20 wherein the plurality of regions are equally divided along the at least one direction.

33. A medium as in claim 20 wherein the method further comprises:
instructing graphics hardware of the digital processing system to perform the piecewise linear scaling of the plurality of regions.

34. A medium as in claim 33 wherein the graphics hardware comprises a graphics processing unit (GPU); and, the digital processing system comprises a central processing unit (CPU).

35. A medium as in claim 34 wherein the method further comprises:
receiving input specifying the nonlinear scaling.

36. A medium as in claim 35 wherein the method further comprises:
determining the plurality of regions according to the input.

37. A medium as in claim 33 wherein the graphics hardware converts the first video image from a first color space to the second video image in a second color space.

38. A medium as in claim 37 wherein the second video image is stored in a frame buffer for display on the display device of the digital processing system.

39. A data processing system to scale a video image, the data processing system comprising:
means for storing a nonlinear function to transform a first video image having a first aspect ratio to a second video image having a second aspect ratio, the second aspect ratio being different from the first aspect ratio, wherein the nonlinear function comprises piecewise linear scaling of a plurality of regions according to different scaling factors along at least one direction; and
means for performing nonlinear scaling of the first video image along the at least one direction according to the nonlinear function to generate the second video image.

40. A digital processing system to scale a video image, the digital processing system comprising:
a bus;
memory coupled to the bus, the memory storing a first video image having a first aspect ratio and the memory storing a nonlinear function to transform the first video image to a second video image having a second aspect ratio, the second aspect ratio being different from the first aspect ratio, wherein the nonlinear function comprises piecewise linear scaling of a plurality of regions according to different scaling factors along at least one direction; and
a processor coupled to the bus, the processor performing nonlinear scaling of the first video image along the at least one direction according to the nonlinear function to generate the second video image.

41. A digital processing system as in claim 40 wherein the first aspect ratio is preserved at a center portion of the second video image.

42. A digital processing system as in claim 40 wherein the first video image comprises a video image frame from a video stream comprising a plurality of frames.

43. A digital processing system as in claim 40 wherein the determining comprises determining the nonlinear function based on user input.

44. A digital processing system as in claim 40 further comprising:
graphics hardware coupled to the bus;
wherein a texture mapping functionality of the graphics hardware is used to perform the nonlinear scaling.

45. A digital processing system as in claim 44 wherein the graphics hardware is instructed by graphics functions of one of: a) OpenGL; and, b) DirectX.

46. A digital processing system as in claim 40 wherein the second video image has at least two different aspect ratios within the second video image.

47. A digital processing system as in claim 40 wherein a first rectangular region of the first video image is scaled as a first rectangular region of the second video image; aspect ratios of the first rectangular region of the first video image and the first rectangular region of the second video image are substantially the same; a second rectangular region of the first video image is scaled as a second rectangular region of the second video image; and aspect ratios of the second rectangular region of the first video image and the second rectangular region of the second video image are substantially different.

48. A digital processing system as in claim 47 further comprising:
an input device coupled to the bus to receive input specifying one of:
a) the first rectangular region of the first video image; and
b) the first rectangular region of the second video image.

49. A digital processing system as in claim 40 wherein the first video image has a first rectangular boundary of the first aspect ratio; and, the second video image has a second rectangular boundary of the second aspect ratio.

50. A digital processing system as in claim 49 wherein the at least one direction comprises at least one of:
a) a direction along horizontal pixel lines of the first video image; or
b) a direction along vertical pixel lines of the first video image.

51. A digital processing system as in claim 50 wherein the at least one direction comprises:
a) a direction along horizontal pixel lines of the first video image; and
b) a direction along vertical pixel lines of the first video image.

52. A digital processing system as in claim 40 wherein the plurality of regions are equally divided along the at least one direction.

53. A digital processing system as in claim 40 further comprising:

graphics hardware coupled to the bus, the graphics hardware performing the piecewise linear scaling of the plurality of regions in response to instructions from the processor.

54. A digital processing system as in claim 53 wherein the graphics hardware comprises a graphics processing unit (GPU).

55. A digital processing system as in claim 54 further comprising:
an input device coupled to the bus, the input device receiving input that specifies the nonlinear scaling.

56. A digital processing system as in claim 55 wherein the processor determines the plurality of regions according to the input.

57. A digital processing system as in claim 53 wherein the graphics hardware converts the first video image from a first color space to the second video image in a second color space.

58. A digital processing system as in claim 57 wherein the memory comprises a frame buffer; and, the second video image is stored in the frame buffer for display on the display device of the digital processing system.

59. An apparatus for displaying video images, the apparatus comprising:
a scaling circuit for scaling a received video image of a first aspect ratio nonlinearly along at least one direction to generate an output video image of a second aspect ratio, the second aspect ratio being different from the first aspect ratio, wherein the scaling is performed according to a nonlinear function to transform the received video image to the output video image and wherein the nonlinear function comprises piecewise linear scaling of a plurality of regions according to different scaling factors along the at least one direction; and
a display device coupled to the scaling circuit to display the output video image.

60. An apparatus as in claim 59 wherein the first aspect ratio is preserved at a center portion of the second video image.

61. An apparatus as in claim 59 wherein the first video image comprises a video image frame from a video stream comprising a plurality of frames.

62. An apparatus as in claim 59 wherein the determining comprises determining the nonlinear function based on user input.

63. An apparatus as in claim 59 wherein the second video image has at least two different aspect ratios within the second video image.

64. An apparatus as in claim 59 wherein a first rectangular region of the first video image is scaled as a first rectangular region of the second video image; aspect ratios of the first rectangular region of the first video image and the first rectangular region of the second video image are substantially the same; a second rectangular region of the first video image is scaled as a second rectangular region of the second video image; and aspect ratios of the second rectangular region of the first video image and the second rectangular region of the second video image are substantially different.

65. An apparatus as in claim 59 further comprising:
a first signal receiving circuit coupled to the scaling circuit, the first signal receiving circuit receiving the first video image from a source external to the apparatus.

66. An apparatus as in claim 59 wherein the apparatus comprises a television set.

67. An apparatus as in claim 59 wherein the apparatus comprises computer monitor.

* * * * *